US008795051B2

(12) United States Patent
Muir et al.

(10) Patent No.: US 8,795,051 B2
(45) Date of Patent: Aug. 5, 2014

(54) CASHLESS RESERVATION SYSTEM

(76) Inventors: Robert Linley Muir, Lane Cove (AU); David Curry, Lane Cove (AU)

( * ) Notice: Subject to any disclaimer, the term of this patent is extended or adjusted under 35 U.S.C. 154(b) by 1409 days.

(21) Appl. No.: 10/561,486

(22) PCT Filed: Jun. 18, 2004

(86) PCT No.: PCT/AU2004/000799
§ 371 (c)(1),
(2), (4) Date: Oct. 18, 2006

(87) PCT Pub. No.: WO2004/111954
PCT Pub. Date: Dec. 23, 2004

(65) Prior Publication Data

US 2008/0132308 A1 Jun. 5, 2008

(30) Foreign Application Priority Data

Jun. 19, 2003 (AU) ................................ 2003903111

(51) Int. Cl.

| | |
|---|---|
| ***A63F 9/00*** | (2006.01) |
| ***A63F 13/00*** | (2014.01) |
| ***G06F 17/00*** | (2006.01) |
| ***G06F 19/00*** | (2011.01) |

(52) U.S. Cl.
USPC ........................................................... 463/16

(58) Field of Classification Search
USPC ........................................................... 463/20
See application file for complete search history.

(56) References Cited

U.S. PATENT DOCUMENTS

| | | | | |
|---|---|---|---|---|
| 5,265,874 A * | 11/1993 | Dickinson et al. | .............. | 463/25 |
| 5,429,361 A * | 7/1995 | Raven et al. | .................... | 463/25 |

(Continued)

FOREIGN PATENT DOCUMENTS

| | | |
|---|---|---|
| AU | 199924974 | 4/1999 |
| EP | 0534718 A2 | 3/1993 |

(Continued)

OTHER PUBLICATIONS

Statement of Grounds and Particulars in Support of Opposition in the Matter of Australian Patent Application 2007202381 in the name of Aristocrat Technologies Australia Pty Ltd and Opposition thereto by IGT, dated Sep. 8, 2008, 24 pages.

(Continued)

*Primary Examiner* — Omkar Deodhar
*Assistant Examiner* — Reginald Renwick
(74) *Attorney, Agent, or Firm* — McAndrews, Held & Malloy, Ltd.

(57) ABSTRACT

A gaming system includes a system controller, a means for establishing a credit on the system, a plurality of gaming machines, and a communications system connecting each of the plurality of gaming machines to the system controller. The gaming machines each have credit register, a player input device, a tracking input device and a game controller. Each game controller is arranged to play a game when a player has established a credit in the credit register of the respective gaming machine and the credit establishment means is arranged to establish a player credit and to associate that credit with a player tracking means (such as a magnetic stripe card or a fingerprint) of a player establishing the credit. While a player is playing a game on a selected machine the credit is held in the credit register of the selected gaming machine, and the gaming machine is responsive to the presence of a player credit held by in the credit register of the selected machine to lock the machine preventing play by any player unless the machine is supplied via the tracking input device, with a player tracking means associated with the credit held in the credit register.

38 Claims, 6 Drawing Sheets

(56) References Cited

U.S. PATENT DOCUMENTS

| | | | | |
|---|---|---|---|---|
| 5,547,202 | A | 8/1996 | Tsumura | |
| 5,586,936 | A | 12/1996 | Bennett et al. | |
| 5,952,640 | A | 9/1999 | Lucero | |
| 5,954,583 | A * | 9/1999 | Green | 463/29 |
| 6,162,122 | A | 12/2000 | Acres et al. | |
| 6,511,377 | B1 | 1/2003 | Weiss | |
| 6,634,942 | B2 * | 10/2003 | Walker et al. | 463/20 |
| 6,638,169 | B2 * | 10/2003 | Wilder et al. | 463/35 |
| 6,743,098 | B2 | 6/2004 | Urie et al. | |
| 6,846,238 | B2 * | 1/2005 | Wells | 463/39 |
| 6,916,244 | B2 * | 7/2005 | Gatto et al. | 463/25 |
| 7,107,245 | B1 * | 9/2006 | Kowalick | 705/44 |
| 2001/0050311 | A1 | 12/2001 | Avellino | |
| 2002/0070275 | A1 | 6/2002 | Mullins et al. | |
| 2002/0155887 | A1 | 10/2002 | Criss-Puszkiewicz et al. | |
| 2002/0160834 | A1 | 10/2002 | Urie et al. | |
| 2003/0220138 | A1 * | 11/2003 | Walker et al. | 463/25 |
| 2004/0053684 | A1 * | 3/2004 | Chudd et al. | 463/25 |
| 2005/0143166 | A1 | 6/2005 | Walker et al. | |
| 2006/0111168 | A1 | 5/2006 | Nguyen et al. | |
| 2008/0132308 | A1 | 6/2008 | Muir et al. | |

FOREIGN PATENT DOCUMENTS

| | | |
|---|---|---|
| EP | 0589545 | 3/1994 |
| WO | 94/12953 | 6/1994 |
| WO | 94/16416 A1 | 7/1994 |
| WO | WO 94/16416 | 7/1994 |
| WO | 98/12648 | 3/1998 |
| WO | WO 2008/127870 | 10/2008 |

OTHER PUBLICATIONS

Statement of Grounds and Particulars in Support of Opposition in the Matter of Australian Patent Application 2004248208 in the name of Aristocrat Technologies Australia Pty Ltd and Opposition thereto by IGT, dated May 29, 2008, 20 pages.

International Search Report and Written Opinion corresponding to International Application Serial No. PCT/AU2004/000799, mailed Jul. 28, 2004.

Written Opinion of the International Searching Authority corresponding to International Application Serial No. PCT/AU2004/000799, mailed Jul. 28, 2004.

USPTO Office Action, U.S. Appl. No. 11/754,065, mail date of Jun. 30, 2008.

USPTO Office Action, U.S. Appl. No. 11/754,065, mail date of Apr. 13, 2009.

USPTO Office Action, U.S. Appl. No. 11/754,065, mail date of Oct. 2, 2009.

USPTO Office Action, U.S. Appl. No. 11/441,315, mail date of May 14, 2008.

USPTO Office Action, U.S. Appl. No. 11/441,315, mail date of Mar. 18, 2009.

USPTO Office Action, U.S. Appl. No. 11/441,315, mail date of Sep. 15, 2009.

Examiner's First Report corresponding to Australian Patent Application No. 2008201645, dated Feb. 23, 2009.

* cited by examiner

CASHLESS RESERVATION SYSTEM

INTRODUCTION

The present invention relates generally to the field of gaming and in particular the invention provides an improved method for reservation of a gaming machine for or by a player in a number of circumstances such as when the player is away from the machine establishing or topping up a credit, moving a credit from one machine to another or simply wishes to briefly move away from the machine such as to go to the rest room.

BACKGROUND OF THE INVENTION

A line-of-sight gaming system operates with cashless transfers between a cashier and gaming machines. A player gives money to a cashier who instructs the system to place credits on the players selected machine. The gaming machine is (or should be) in the cashiers line-of-sight so they can see the machine is not currently being played and that once the players has paid that no one else uses the machine.

Aristocrat Technologies operated a line-of-sight cashless system called BIPS in New South Wales, Australia in the 1990's.

A disadvantage of these systems is that the number of machines on the gaming floor is limited to those visible to the cashier.

Gaming machines may have a reservation button, enabling players to reserve a gaming machine for their use. The player presses the reserve button and the gaming machine enters the reserve mode, and displays a reserve message. When the reserve button is pressed again the machine exits the reserve mode.

U.S. Pat. No. 5,429,361 describes a gaming system in which a magnetic card is used as a reservation lock. This patent describes to a traditional gaming system using magnetic cards, where the reserve key only works when the player's magnetic card is inserted. If they press reserve, then remove their card the machine cannot be unreserved until the card is reinserted. After a predetermined timeout period the machine will automatically unreserve. This is ideal for players to take short breaks without the possibility of someone else stealing their money.

SUMMARY OF THE INVENTION

According to a first aspect, the present invention consists in a gaming system including a system controller, a credit establishment means, a plurality of gaming machines, and a communications system connecting each of the plurality of gaming machines to the a system controller, the gaming machines each having credit recording means or credit register, a player input device, a tracking input device and a game controller, each game controller being arranged to play a game when a player has established a credit in the credit recording means of the respective gaming machine, the gaming system being characterised in that the credit establishment means is arranged to establish a player credit and to associate that credit with a player tracking means of a player establishing the credit, and while a player is playing a game on a machine selected by the player from the plurality of gaming machines the credit is held in the credit recording means of the selected gaming machine, each gaming machine being responsive to the presence of a player credit held by in the credit recording means of the respective machine to lock the machine preventing play by any player unless the machine is supplied via the tracking input device, with a player tracking means associated with the credit held in the credit recording means of the respective gaming machine.

According to a second aspect, the present invention consists in a gaming machine connected to a gaming system wherein the gaming system comprises a system controller, a credit establishment means, a plurality of said gaming machines, and a communications system connecting each of the plurality of gaming machines to the system controller, the gaming machine having credit recording means, a player input device, a tracking input device and a game controller, the game controller being arranged to play a game when a player has established a credit in the credit recording means of the gaming machine, the gaming machine being characterised in that the credit establishment means is arranged to establish a player credit and to associate that credit with a player tracking means of a player establishing the credit, and while a player is playing a game on the gaming machine the credit is held in the credit recording means of the gaming machine, and the gaming machine being responsive to the presence of a player credit held in the credit recording means to lock the gaming machine preventing play by any player unless a player tracking means is supplied to the machine via the tracking input device, whereby the machine identifies the player tracking means as being associated with the credit held in the credit recording means of the gaming machine.

According to a third aspect, the present invention consists in a player tracking means, when used with a gaming system including a system controller, a credit establishment means, a plurality of gaming machines, and a communications system connecting each of the plurality of gaming machines to the system controller, the gaming machines each having credit recording means, a player input device, a tracking input device and a game controller, each game controller being arranged to play a game when a player has established a credit in the credit recording means of the respective gaming machine, the gaming system being characterised in that the credit establishment means is arranged to establish a player credit and to associate that credit with a player tracking means, of the player establishing the credit, and while a player is playing a game on the gaming machine the credit is held in the credit recording means of a gaming machine selected by the player from the plurality of gaming machines, each gaming machine being responsive to the presence of a player credit held in the credit recording means of the respective machine to lock the machine preventing play by any player unless the machine is supplied via the tracking input device, with a player tracking means associated with the credit held in the credit recording means of the respective gaming machine.

The credit establishment means may be connected to the system controller either directly or via the communications system.

Game are typically initiated on a gaming machine by the player playing the machine after staking a wager, which is deducted from the player's credit recorded in the credit recording means. The game will end with an outcome or game result which, if it is a winning result, will cause the game control means to award a prize to the player. Typically, the prize is then added to the players credit held in the credit recording means. Each gaming machine further includes a display means and the game controller is arranged to control game images displayed on the respective display means and to display game results at the end of the game.

When the credit establishment means establishes a player credit and associates that credit with a player tracking means of a player establishing the credit, the credit may be held either in the system controller or in the credit recording means of the machine selected by the player. When the credit is held in the system controller it will be transferred to the credit recording means of the machine selected by the player when the player inserts the associated player tracking means into the tracking input device of the selected machine.

The player tracking means may include, by way of example, a magnetic stripe card, which may either have been issued by the gaming establishment as an in-house identification mechanism, or which may be a credit card issued by a remote financial institution, a smart card issued by the gaming establishment or the remote financial institution, a ticket printed by the gaming establishment and readable by a bill acceptor mounted within the gaming machine, or any other suitable identification media, or the system may employ a fingerprint identification system, iris scanning system or other suitable bio-sensor based identification system to enable a physical characteristic of the player to be used as the player tracking means.

The gaming machines connected to the system may include a reservation button which when pressed while the player tracking means is present causes the machine to lock and prevent further play in the absence of the respective player tracking means. Depending on the requirements of the gaming system operator, locking may occur always or alternatively only when the players remaining credit is non-zero.

The gaming machines connected to the system may include a timeout means such that when the machine is locked for more than a predetermined time any credit held in the credit recording means of the machine is transferred to the gaming system controller and held there for the player and the machine is unlocked to allow another player to establish a credit in the credit recording means of the machine and commence play.

The gaming machines connected to the system may include credit importing means such that when a player tracking means is supplied to a gaming machine that is not currently holding a player credit in its credit recording means and is unlocked, the gaming machine will signal the system controller to transfer the players credit of the player supplying the player tracking means to the credit recording means of the respective gaming machine.

BRIEF DESCRIPTION OF THE DRAWINGS

An embodiment of the invention is now described by way of example with reference to the accompanying diagrammatic drawings in which:—

FIGS. 5*a* and 5*b* show a flow chart of the operation of a preferred implementation of the method of

DETAILED DESCRIPTION OF THE PREFERRED EMBODIMENTS

Figure 1:
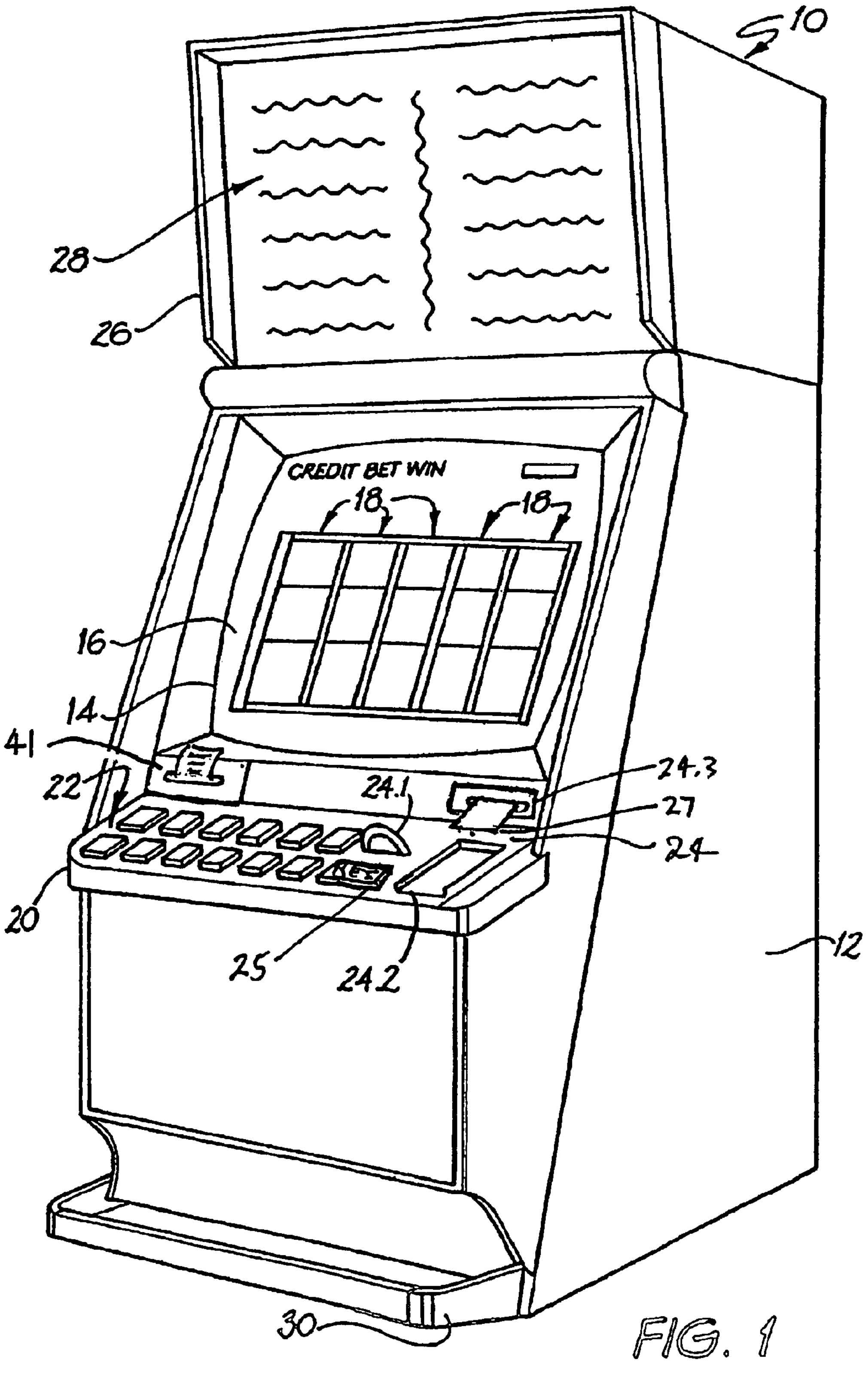
FIG. 1 shows a perspective view of a first style of gaming machine, suitable for use in systems implementing embodiments of the present invention.

Referring to FIG. 1 a typical gaming machine is illustrated of the type to which the present invention can be applied. The machine illustrated in FIG. 1 is of a type that allows credit input by insertion of coins or bills but the invention can also be applied to machines that only allow credit input by transfer of credit from a central cashier or from another gaming machine. In FIG. 1, reference numeral 10 generally designates a gaming machine, including a game or games to be played by a player of the machine. The machine 10 includes a console 12 having a display means in the form of a video display unit 14 on which a game 16 is played. The video display unit 14 may be implemented as a cathode ray screen device, a liquid crystal display, a plasma screen, or the like. The game 16 as illustrated in FIG. 1 is a spinning reel game which simulates the rotation of a number of spinning reels 18, however many other styles of game are also possible.

Figure 2:
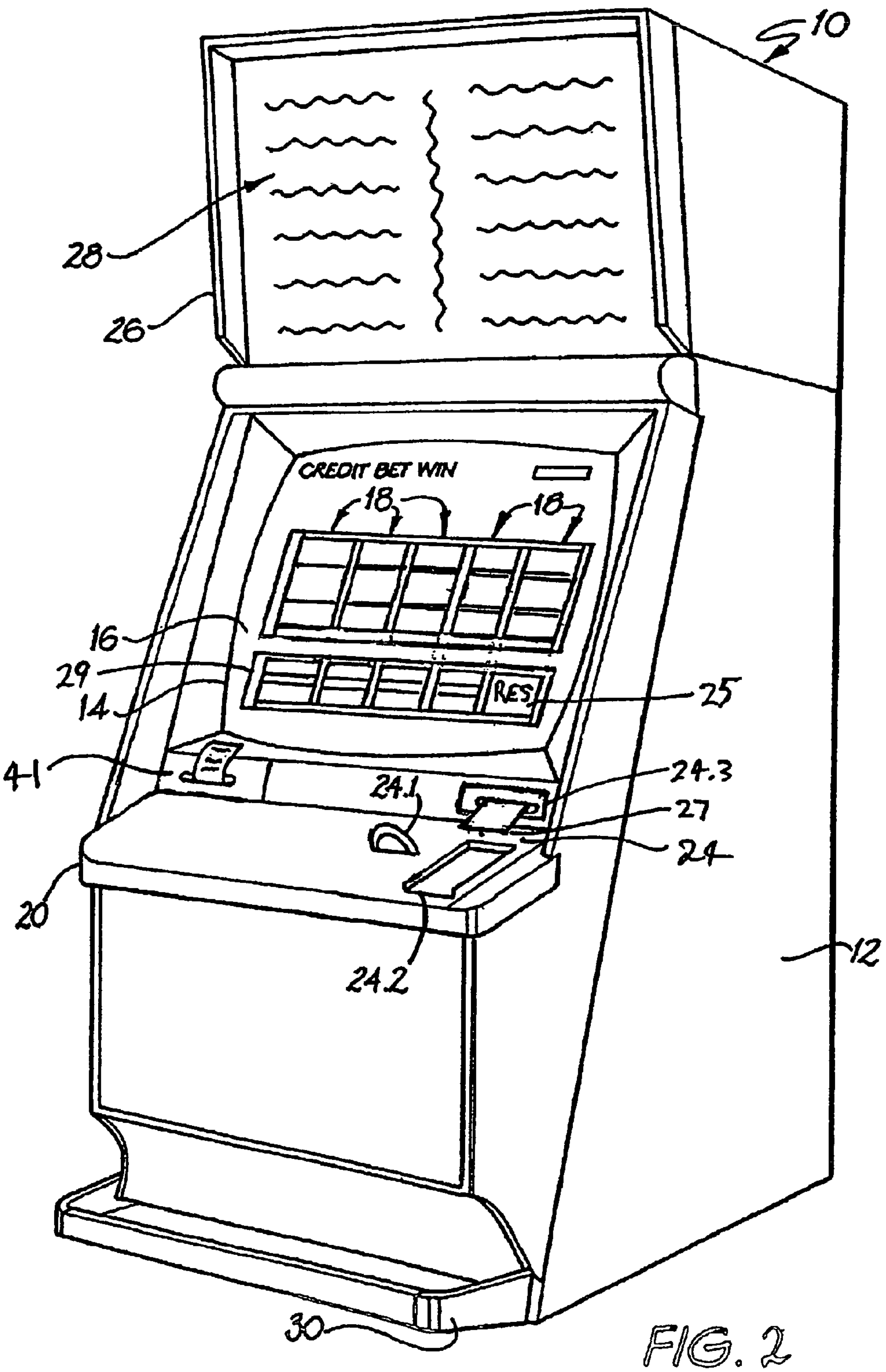
FIG. 2 shows a perspective view of a second style of gaming machine, suitable for use in systems implementing embodiments of the present invention.

A mid-trim 20 of the machine 10 optionally houses a keypad 22 for enabling a player to play the game 16. The mid-trim 20 also houses a credit input mechanism 24 including a coin input chute 24.1 and a bill collector 24.2. As illustrated in FIG. 2, some gaming machines use a touch screen for player input, in which case the keypad 22 would not be required on the mid-trim in those machines. Instead the keys of the keypad 22 of the FIG. 1 machine would be represented as a graphic image 29 on the screen 16 and touch sensors 38 (refer to FIG. 3) located adjacent the screen surface would detect touching of the screen to record player selections. In all other respects the machines of FIGS. 1 and 2 are essentially functionally identical.

The machine 10 of FIGS. 1 and 2 includes a top box 26 on which artwork 28 is carried. The artwork 28 includes paytables, details of bonus awards, etc.

A coin tray 30 is mounted beneath the console 12 for cash payouts from the machine 10.

In machines employing the present invention the machine is also connected via a computer network to other gaming machines and a system controller and credits can be applied to and cleared from the machine via the network. The credits can either be established at a cashiers station and transferred to the machine or alternatively a player might already have credits in another machine in the network and which they transfer to a new machine that they wish to play.

To facilitate the secure transfer of cash to a machine, each machine is provided with a card reader 24.3 and the player is issued with an identification card 27 either when entering the premises or when establishing credit in the system. This identification card 27 is inserted into the card reader 24.3 of a machine by the player after the player has established a credit on the system and has had the credit transferred to the desired machine. By inserting the card 27 into the card reader 24.3 of the machine he or she intends to play, the player identifies him or herself to the machine and establishes that the credit belongs to them. In the illustrated embodiment, the card reader 24.3 is not connected directly to the machine's controller 36 but to the system interface 51, which is connected to the network via interconnection 52 and to the machine controller 36 as seen in FIG. 3.

A reservation button 25 is provided as one of the buttons of the keypad 22 or of the pseudo-keypad 29 and is used in some circumstances to manually reserve the machine such as when the player wishes to go to the bathroom. To reserve the machine the player would press the reservation button while their identification card 27 is still in the slot of the card reader 24.3. Then by removing the card, the machine would become locked preventing use of the machine by others until the original player's card is reinserted in the slot of the card reader 25.3, or until the reservation period times out as discussed below. In the event that the reservation period times out, the machine would transfer any credits held on the machine to a player account in a central controller and unlock the machine for play by another player. If the player decided to play another machine after having reserved the previous machine they were playing, they would simply insert their identification card into the new machine which would cause their credit on the previous machine to transfer to the new machine and unlock the previous machine. If, on the other hand, the reservation period had timed out on the previous machine and the players credit had been transferred to the central controller, then the new machine would simply transfer the players credit from the central controller to the new machine.

Figure 3:
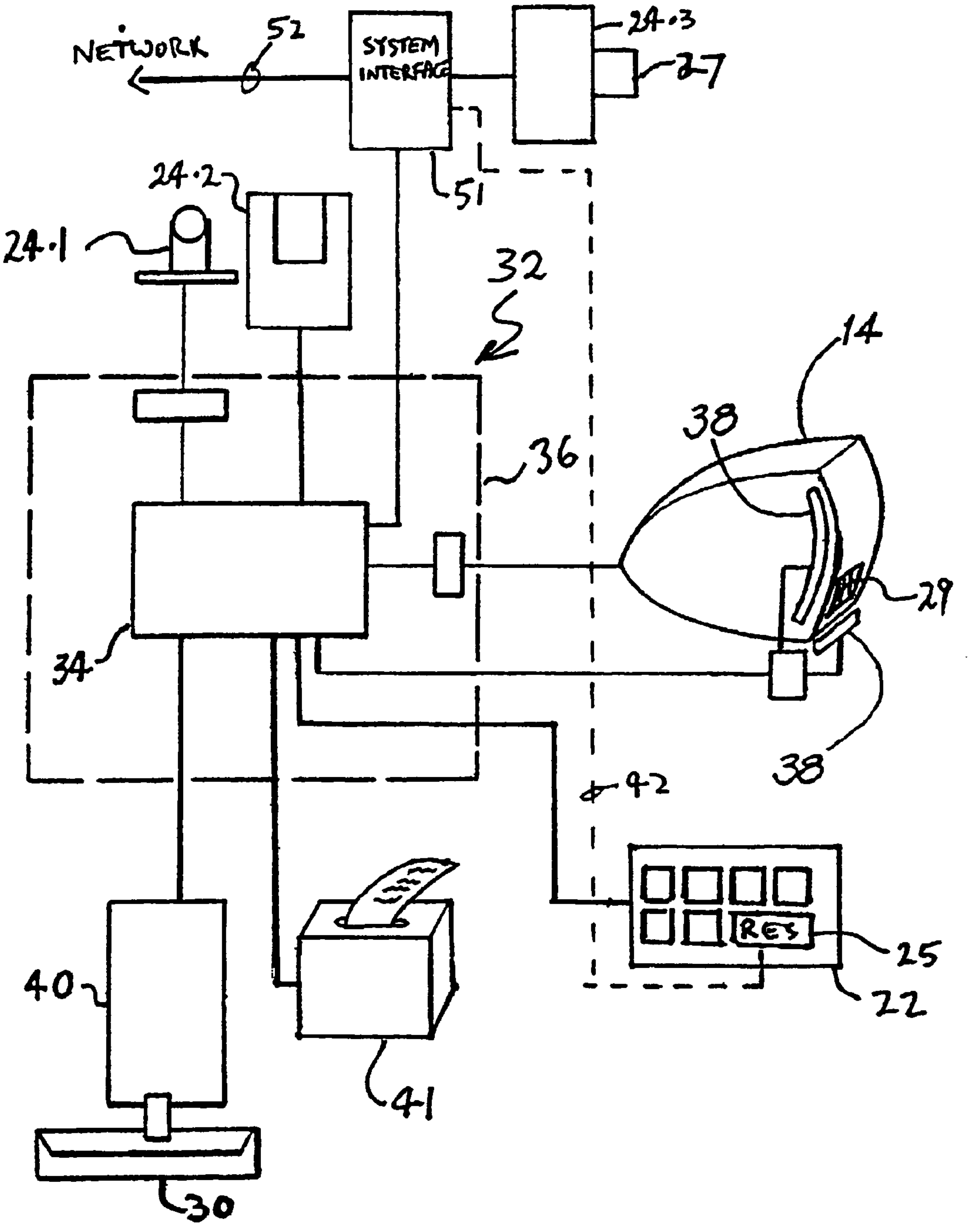
FIG. 3 shows a block diagram of a control circuit of the gaming machines of FIGS. 1 and 2.

Referring to FIG. 3 of the drawings, a control means or control circuit 32 is illustrated. A program which implements the game and user interface is run on a processor 34 of the control circuit 32. The processor 34 forms part of a controller 36 that drives the screen of the video display unit 14 and that receives input signals from player input devices such as the optional keypad 22 (see FIG. 1) or the optional sensors 38 associated with the pseudo-keypad 29 (see FIG. 2). The sensors 38, if used, include touch sensors mounted in the screen of the video display unit 14 and associated with the representation of pseudo-buttons of the keypad 29, displayed on the display 16, thereby replicating the buttons of the keypad 22. The controller 36 also receives input pulses from the mechanism 24 to determine whether or not a player has provided sufficient credit to commence playing. The credit input mechanism 24 may comprise one or more of several credit input devices such as a coin input chute 24.1 a bill collector 24.2, and a card reader 24.3 or any suitable other type of validation device. In some embodiments of the present invention it is important that there be a player tracking input device, such as the card reader 24.3, that can be used to associate a particular player with a particular credit held in the system (either as data held in a machine or in the system controller or possibly in a further controller reserved for financial information). Note that player identification does not require knowing the actual identity of the player but is only used to associate the player with a particular credit. This is achieved in the preferred embodiment by using a player tracking card 27, which is a simple magnetic stripe card encoded with a unique code, that may be issued to the player either when they enter the establishment or when they establish a credit in the system and is read by the card reader 24.3. However other methods of player identification can be employed such as pin numbers, sc able tags of various known types such as magnetic stripe cards, smart cards, etc, iris recognition, finger prints or other bio-sensor systems.

Finally, the controller 36 optionally drives a payout mechanism which, for example, may be ticket printer 41, or a coin hopper 40 for feeding coins to the coin tray 30 to make a pay out to a player when the player wishes to redeem his or her credit. Again however, in embodiments of the present invention, a payout mechanism is not essential as the player may remove the credit held in the machine by transferring it to another machine or to a cashier.

Figure 4:
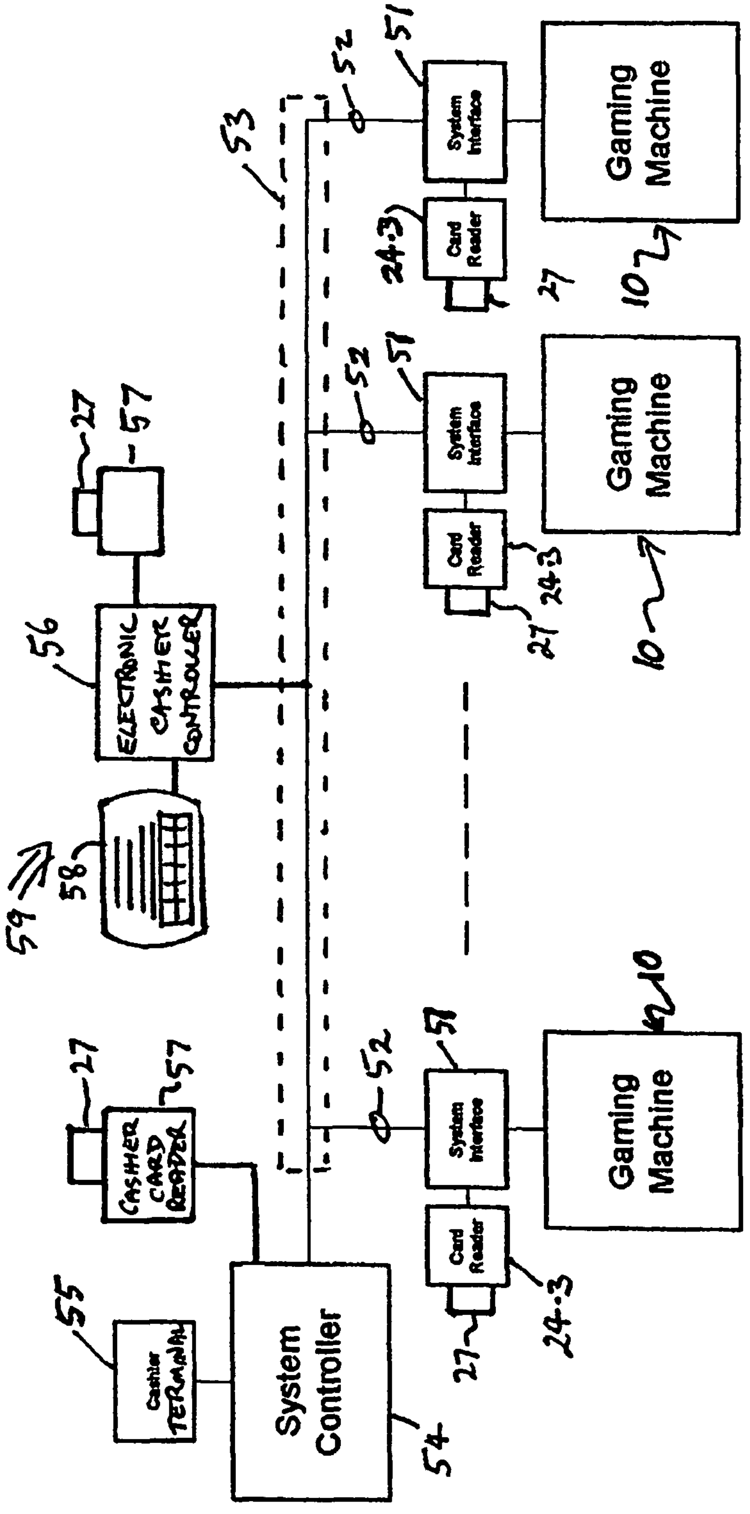
FIG. 4 shows a block diagram of a system implementing an embodiment of the present invention.

Referring to FIG. 4, a system in which the present invention is implemented is illustrated. The system comprises a plurality of gaming machines 10 each connected to a network by its respective system interface 51 and network connection 52. The Network connections 52 are preferably connected to the remainder of the network via a hub 53 although other networking architectures such as daisy chaining may also be employed. Controlling the network is a system controller 54 and a cashier's terminal 55 is optionally connected, either to the system controller 54 directly, as illustrated in FIG. 4, or alternatively via the network hub 53. The Cashier may be replaced or supplemented by an electronic cashier or cash in/cash out terminal 59 comprising a controller 56 to which is connected a user touch screen 58 and a card reader 57. The electronic cashier uses EFT transactions to debit or credit a player's account at a financial institution to establish or refund a player's credit in the gaming system.

Figure 5A:
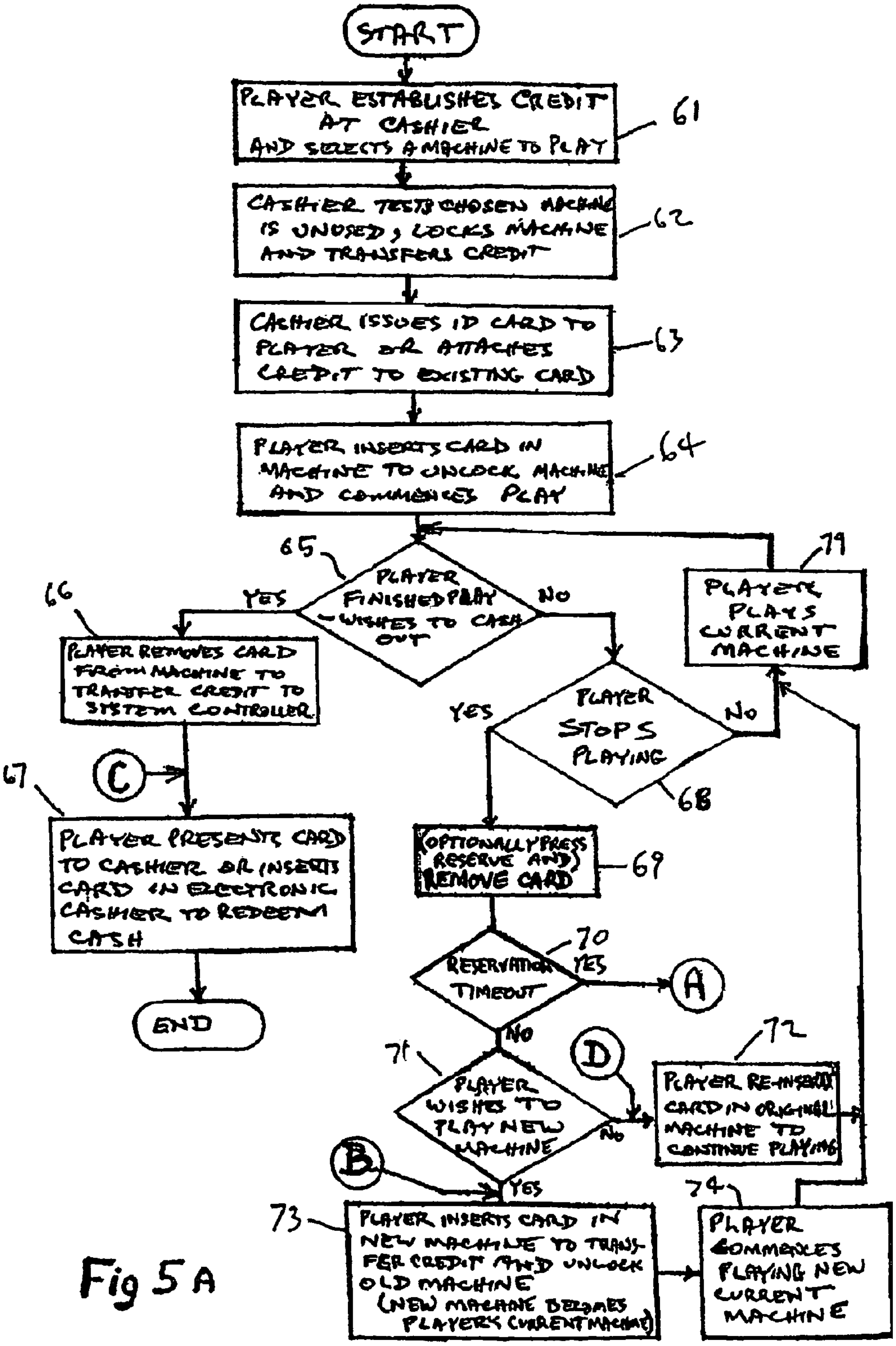
Figure 5B:
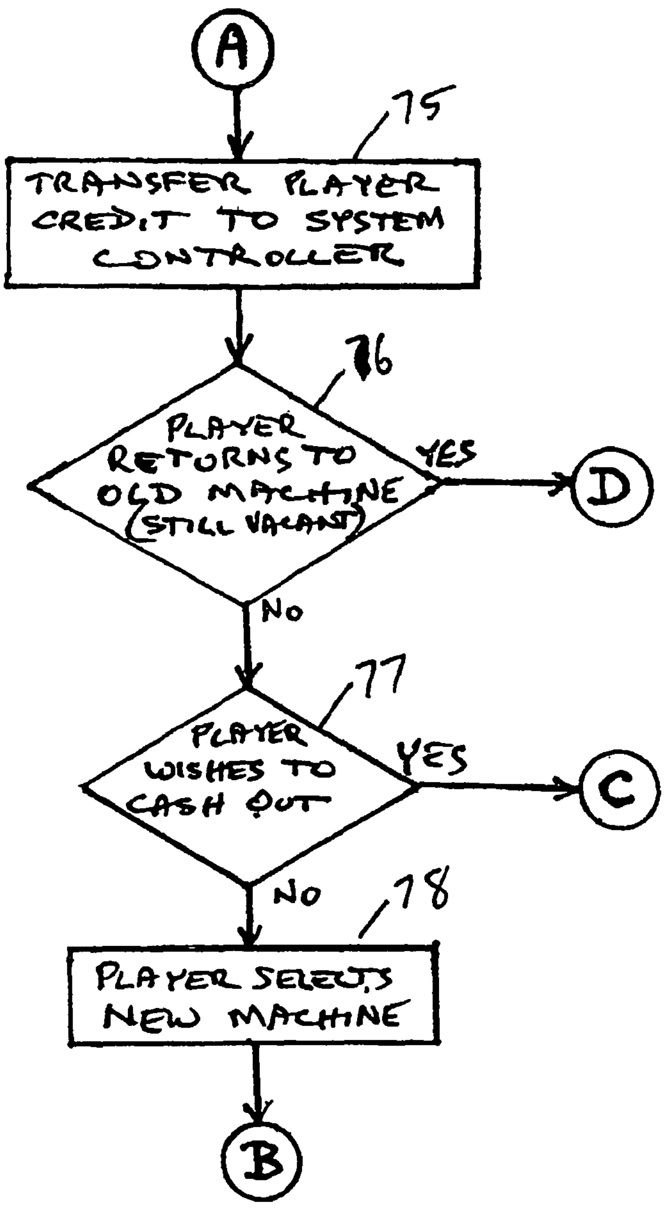

Referring to the flow chart of FIG. 5, the illustrated embodiment of the invention provides an improvement on the traditional line-of-sight system for establishing a credit on a gaming machine. As before, the player gives money to a cashier and selects 61 a gaming machine to play. If the player's selected machine is not in use credits are transferred 61 to the gaming machine. However, when the credits are transferred to the gaming machine it is automatically locked to prevent play. The player is given 63 a unique key which is used as a player tracking device and the key is associated with the credits transferred to the selected gaming machine. Preferably the key is a low cost magnetic card 27 encoded with a unique tracking number, and it is inserted into a compatible magnetic card reader 24.3 on the gaming machine to unlock the selected gaming machine.

The player then proceeds to the selected gaming machine and inserts 64 the card 27 to unlock the machine and proceed to play 79 the machine. As no other player can unlock and hence play the locked gaming machine, line-of-sight visibility is no longer required. Further the cashier need no longer be a person, and could be an automated cash in/out, and card dispensing machine 59.

When the player has finished playing the gaming machine 10, and decides 65 to "cash out", they remove 66 the card 27 and return it 67 to the cashier. When the card 27 is removed the gaming machine is again automatically locked, and secured against interference. The player presents 67 the card 27 to the cashier or inserts the card 27 into an electronic cashier 59 and the money remaining on the gaming machine is transferred back to the cashier and paid to the player by the cashier or is dispensed from the electronic cash in/out terminal, and the gaming machine is automatically unlocked for further play.

Once returned to the cashier the system may either allow the reuse of the card or prevent its further use. The card may be permanently destroyed by physical means, such as punching holes in the magnetic strip. The card may also be destroyed by logical means by recording its unique identification number in a database and not permitting its reuse. Further, cards may be enabled for use only for a preset time, for example with 24 hours of being issued, after which they are permanently disabled.

An unlocked machine with no credits cannot, of course, be played. In some implementations the gaming machines will have alternate means of inputting credits, such as a coin chute 24.1, a bank note acceptor 24.2, and can be played without an identification card. In the case where the gaming machine has no alternate credit input means it may not be necessary to unlock the machine when it has no credits, although this may in fact be done. One other reason to unlock the machine is that help and attract modes may only operate in the unlocked stated. Rather than change the design of current games to display help and attract when locked it may be preferable to simply unlock the machine, even if it cannot be played (because it has no credits).

Prior to the initial transfer of credits to the player's selected gaming machine the system detects if the gaming machine is currently in use 62 and if so, does not allow the transfer to proceed. The detection means determines that a player is currently using a machine if a valid card is inserted, there are credits on the machine, or buttons or touch screen have recently been used. For example, the machine may have zero credits but a player is using the gaming machine's built-in help to examine the game. Further detection means, such as physical proximity detection, are possible.

In a further improvement, the player may decide 68 to stop playing the machine either because they wish to move to another machine or because they wish to take a short break. In this case, they will remove 69 their card 27 from the machine which will cause it to lock while still retaining the player's credit. If the player chooses 71 to play a new machine they will move to the new machine and insert 73 their card 27. The system detects the card 27 is in a different machine (and is no longer in the original machine), and automatically performs a cashless transfer of all the money from the original machine to the new one. Once complete, both machines are unlocked and the player commences playing 74 the new machine.

In the event that after the player temporarily stops playing 68 a machine and lock it by removing 69 their card 27, they return 72 to the same machine and reinsert their card they may continue playing that machine.

When the player leaves a machine 68, the removal 69 of the card 27 leaves the machine locked until the player redeems 67 the outstanding credits from a cashier or it is transferred 73 to another machine. However, it is also possible that they will leave the machine locked permanently if they do not redeem their credits. To prevent this happening the system implements a timeout mechanism 70. Preferably, the operator is automatically notified to take appropriate action, such as performing manual cash out on the machine which results in the player's credit being held at the system controller until claimed 77, 67 by the player, or until the player tries to play with the same machine or a different machine. A full log of events is stored to enable tracking in case the player returns to play the machine further and a dispute arises with the casino operators. Alternately after the preset timeout period 70 of a locked machine, the system automatically withdraws credit 75 from the machine and unlocks it for further play. In the event that the player returns 76 to the old machine and it is still vacant, they may reinsert 72 their card 27 in the machine which will cause the credit to transfer back to the machine after which the machine will allow the player to continue playing 79. Alternatively, the player may choose to select 78 an new machine, in which case inserting 73 their card 27 into the card reader of the new machine will cause their credit to transfer to the new machine, which will unlock allowing the player to commence 74 playing the new machine The system may also detect multiple copies of the same card 27 in use, which would indicate either an error in the system or attempted fraud. The system takes appropriate action, such as locking the effected machines and/or setting off an alarm.

It is an advantage of preferred embodiments of this invention that the credits need not be stored at any time by the system, although it can be implemented to do so. The storage and handling of money is a very sensitive issue, and it is preferable to limit it to those areas in which it is absolutely essential. Gaming machines already require and implement the means to store credits and are carefully tested and regulated to ensure they do so reliably.

In an alternate implementation the player gives 61 money to the cashier and it is stored on the system, and associated 63 with the player's identification card 27 until the player inserts 64 their card 27 into a gaming machine. This has the advantage of simplicity from the player's point of view, but does require that credits be kept on the system until the player selects a machine.

It is an advantage of preferred embodiments of the system that the player need not be identified to use the system, although of course this may be done if desired. The means of doing this are well known and not described further.

Machine to Machine Credit Transfer Protocol

The system is designed such that a fault during the cashless transfer, such as a power failure or communication error, does not cause credit to be added or lost. Such techniques are well known, and one example, in which the system does not store player credit information, is described here by way of example:

When the magnetic stripe card is inserted into the new machine it is detected and a message sent to the system controller with the cards identification. The system determines that the card had been previously played on a different machine, and adds the exact same amount of credits to the new machine as exists on the previous machine. At this point the player may start to play, but the previous machine still contains its credits unchanged, and remains locked. The system then removes the credits from the first machine and unlocks it.

The system logs each of these events and in the event of a failure can determine how to recover. Preferably a human readable log of events is simultaneously printed, identifying each cashless transaction. If a failure occurs before credits are transferred to the new machine, they still exist on the first machine and are not lost. If the failure occurs after the transfer to the new machine, the player cannot lose credits. Until the first machine is unlocked it cannot be played, so the operator will not lose any credits on that machine. The electronic or printed log may be used to understand the actual events and reconcile accounts.

Machine Reservation

Preferably the gaming machine 10 is automatically locked in when the player's card 27 is removed, except when the credit on the machine is zero, in which case the machine remains unlocked. In one implementation the gaming machine 10 may have a reserve function button 25 to reserve the machine, by locking it even when the card is removed and credits are zero provided the reservation button is operated before the cards 27 is removed 68, or during a predetermined short period (for example, 5-10 seconds) after the card is removed. The machine may also refuse to register a new card during this period.

In one possible arrangement, the reservation button may be connected directly 42 to the system interface 51 of the gaming machine 10 (refer to FIG. 4).

Alternately, instead of the reservation button 25 being interfaced directly to the system interface device 51 it may be interfaced to the gaming machine as one of many keys on keypad 22 (as is common in practice). The gaming machine 10 will then read the button status and communicate it to the system interface device 51, and hence on to the system controller 51. Alternately the gaming machine reservation button 25 might be connected 42 to the system interface device 51 as well as to the gaming machine controller 36, such that the system and the machine may both sense the gaming machine reserve button status directly. The ability to reserve a machine with zero credit is particularly useful in implementations where players are issued cards prior to giving money to the cashier. In this implementation players may be given a card on entry to the gaming establishment with no credit associated with the card on the system or any machine. The player may use the card to transfer money to a machine by using the cashier. Alternately the player can use the reservation button on the machine to lock a machine (with no credits), and then using the cashier transfer credits to that machine. The system automatically detects the reserved machine and transfers credit to it, or if the player chooses, to a different machine (in which case the first reserved machine is automatically unlocked).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming system including a system controller, a credit establishment facility, a plurality of gaming machines, a communications system connecting each of the plurality of gaming machines to the system controller, and a player identification device for association with player credit, each of the gaming machines having (1) a credit recording facility, (2) a player input device, (3) a player identification input device responsive to a player identification device; and (4) a game controller to play a game when a player has established a credit in the credit recording facility of the respective gaming machine, wherein the credit establishment facility includes a terminal connected to the communications system for transfer of player credits via the communication system to a selected gaming machine selected for play of a game, said terminal located remotely from the selected gaming machine and arranged to establish a player credit and to associate that credit with a player identification device of the player establishing the credit, and wherein said player credit is transferred to the gaming machine selected for play and said player credit being held in said credit recording facility of the gaming machine selected for play, and wherein the gaming machine selected for play is locked so that the gaming machine no longer operates to play a game by any player solely when player credit held in the credit recording facility of the respective gaming machine selected for play is non-zero, and via player action unlocked so that the gaming machine selected for play operates to play a game when the gaming machine selected for play is supplied via the identification input device with the player identification device associated with the player credit held in the credit recording facility of the respective gaming machine.

2. The system as claimed in claim 1, wherein the selected gaming machine connected to the system includes a reservation button, and wherein actuation of said reservation button locks said selected gaming machine from play.

3. The system as claimed in claim 2, wherein said player action further includes use of said player identification device.

4. The system as claimed in claim 2 wherein said player action includes removal of said player identification card from said player identification device.

5. The system as claimed in claim 3, wherein said actuation of said reservation button occurs while the player tracking device is received by said player identification input device.

6. The system as claimed in claim 1 wherein a gaming machine connected to the system includes a timeout device, and wherein when the machine is locked for more than a predetermined time any credit held in the credit recording facility of the machine is transferred to the system controller and held there for the player and the machine is unlocked to allow another player to establish a credit in the credit recording facility of the machine and to commence play.

7. The system as claimed in claim 1 wherein the player credit established by the credit establishment facility and associated with a player identification device of a player establishing the credit is held in the system controller.

8. The system as claimed in claim 7, wherein each gaming machine connected to the system includes a credit importing facility such that when a player identification device is supplied to a gaming machine that is not currently holding a player credit in its credit recording facility and is unlocked, the gaming machine will signal the system controller to transfer the players credit of the player supplying the player identification device to the credit recording facility of the respective gaming machine.

9. The system as claimed in claim 8, wherein the player credit held in the system controller is transferred to the credit recording facility of the machine selected by the player when the player inserts the associated player identification device into the player identification input device of the selected machine.

10. The system as claimed in claim 1, wherein the player identification device is a token.

11. The system as claimed in claim 10, wherein the token is a magnetic stripe card.

12. The system as claimed in claim 10, wherein the token is a smart card.

13. The system as claimed in claim 10, wherein the token is issued by a gaming establishment as an in-house identification mechanism.

14. The system as claimed in claim 10, wherein the token is a financial transaction card issued by a remote financial institution.

15. The system as claimed in claim 10, wherein the token is a ticket readable by an acceptor mounted within the gaming machine.

16. The system as claimed in any one of claim 1, wherein player identification input device is a bio-sensor input device and the player identification device is a physical attribute of the player.

17. The system as claimed in claim 16, wherein the player identification input device is a fingerprint reader and the player identification device is a fingerprint of the player.

18. The system as claimed in claim 16, wherein the player identification input device is an iris scanner and the player identification device is an eye of the player.

19. The gaming system of claim 1 wherein the selected gaming machine is locked to prevent play when credits are transferred by said terminal prior to the selected gaming machine being supplied with the player identification device.

20. The gaming system of claim 1 wherein the gaming system detects whether the selected gaming machine is in use prior to the transfer of the player credit to the selected gaming machine.

21. The gaming system of claim 1 wherein the gaming system does not allow the transfer of player credits to proceed if the selected gaming machine is in use.

22. The gaming system of claim 1 wherein said terminal is a cashier's terminal operable by a cashier.

23. The gaming system of claim 1 wherein said terminal is cash in/cash out terminal operable by the player.

24. A gaming machine for connection to a gaming system wherein the gaming system comprises a system controller, a plurality of gaming machines, and a communications system connecting each of the plurality of gaming machines to the system controller, the gaming machine comprising (1) a credit recording facility, (2) a player input device, (3) a tracking input device responsive to a player tracking device, and (4) a game controller arranged to play a game when a player has established a credit in the credit recording facility of the gaming machine, wherein one gaming machine of the plurality of gaming machines is locked so that the one gaming machine no longer operates to play a game by any player, solely at a time when player credit held in the credit recording facility of the one gaming machine is non-zero, and automatically unlocked to allow play when a player tracking device is afterward supplied to the tracking input device of another gaming machine, and credit associated with the credit held in the credit recording facility of the one gaming machine is automatically transferred to the credit recording facility of the other gaming machine in response to the player tracking device being supplied to the tracking input device of the other gaming machine.

25. The gaming machine as claimed in claim 24, which includes a reservation button; and wherein said player action includes actuation of said reservation button.

26. The gaming machine as claimed in claim 25, wherein the reservation button is actuated while said player tracking device is received by said tracking input device.

27. The gaming machine as claimed in claim 24 wherein a player credit is established by a credit establishment facility and associated with a player tracking device of a player establishing the credit, said player credit to be held in the system controller.

28. The gaming machine as claimed in claim 27, includes a credit importing facility such that when a player tracking device is supplied to a gaming machine that is not currently holding a player credit in its credit recording facility and is unlocked, the gaming machine will signal the system controller to transfer the player's credit of the player supplying the player tracking device to the credit recording facility of the respective gaming machine.

29. The gaming machine as claimed in claim 28, wherein the player credit held in the system controller is transferred to the credit recording facility of the machine selected by the player when the player inserts the associated player tracking device into the tracking input device of the selected machine.

30. The gaming machine as claimed in claim 24 wherein the player tracking device is a token.

31. The gaming machine as claimed in claim 30, wherein the token is a magnetic stripe card.

32. The gaming machine as claimed in claim 30, wherein the token is a smart card.

33. The gaming machine as claimed in claim 30, wherein token is issued by a gaming establishment as an in-house identification mechanism.

34. The gaming machine as claimed in claim 30, wherein token is a financial transaction card issued by a remote financial institution.

35. The gaming machine as claimed in claim 30, wherein the token is a ticket readable by an acceptor mounted within the gaming machine.

36. The gaming machine as claimed in claim 24 wherein tracking input device is a bio-sensor input device and the player tracking input device is a physical attribute of the player.

37. The gaming machine as claimed in claim 36, wherein the tracking input device is a fingerprint reader and the player tracking device is a fingerprint of the player.

38. The gaming machine as claimed in claim 36, wherein the tracking input device is an iris scanner and the player tracking device is an eye of the player.

* * * * *

UNITED STATES PATENT AND TRADEMARK OFFICE

CERTIFICATE OF CORRECTION

PATENT NO. : 8,795,051 B2
APPLICATION NO. : 10/561486
DATED : August 5, 2014
INVENTOR(S) : Muir et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1557 days.

Signed and Sealed this
First Day of September, 2015

Michelle K. Lee
*Director of the United States Patent and Trademark Office*